3,326,680
ELECTROPHOTOGRAPHIC PROCESS USING AN ALKOXY ETHER ALUMINUM FATTY ACID SALT AS THE CROSS-LINKING CATALYST
Walter L. Garrett, Freeland, Mich., assignor to The Dow Chemical Company, Midland, Mich., a corporation of Delaware
No Drawing. Filed Nov. 25, 1966, Ser. No. 596,823
2 Claims. (Cl. 96—1)

ABSTRACT OF THE DISCLOSURE

This invention relates to electrophotographic processing and more particularly relates to alkoxy ether or mixed alkoxy ether aluminum fatty acid salts having special utility as nongelling catalysts for use in promoting cross-linking of resin-containing photoconductive coatings in a method of developing electrostatic images on a photoconductive resin-containing surface by suspending said catalyst in a hydrocarbon liquid and contacting said liquid containing the catalyst with the electrostatic image to cross-link said resin to form an acid etch resist image. The disclosed process for preparing said alkoxy ether salts comprises in general reacting a primary straight chained glycol ether with an aluminum fatty acid salt under alkaline conditions to form an alkoxy ether aluminum fatty acid salt, and separating the salt from the reaction mass.

This application is a continuation-in-part of application Ser. No. 333,738, filed Dec. 26, 1963, now abandoned.

Many processes have been disclosed to improve the photographic imaging qualities necessary in preparing acid etch-resist images. One such method is a process as disclosed in U.S. Letters Patent 3,231,374 wherein a photoconductive zinc oxide is employed in a cross-linkable resin type insulating binder, such as, for example, SR–82 silicone intermediate resin (made by the General Electric Company) as a photoconductive recording element on a base plate. Said element is then given an electric charge in subdued light, for example, by corona discharge means, followed by exposure to a light image, thereby producing a latent electrostatic image on said recording element, whereupon, it is developed by contact and subsequent heating with one or more catalyst materials, such as, for example, aluminum octanoate, which promote cross-linking of said binder to form an etch-resist image. Subsequently, said resist is normally subjected to the recently developed powderless etching process to make a photoengraved printing plate, said etching process being disclosed, for example, in U.S. Letters Patent 2,828,194 and 3,152,083.

Though such a process as described above for preparing photoengraved plates apparently gives acceptable results, the use of the various catalysts as employed therein for cross-linking the resin binders, for example, aluminum octanoate, does not consistently produce quality etch-resist images.

Catalysts such as aluminum octanoate moreover produce relatively ragged images and deposit to some extent in nonimage areas causing pimples and imperfections in the developed plate. Moreover, catalysts such as aluminum octanoate, being well known gelling agents, when used in liquid developer solutions of hydrocarbon carrier liquids, such as n-heptane, cause gelation of the liquid within a very short time, for example, 3 to 4 hours. Accordingly, the useful life of such a liquid developer composition is extremely limited.

An object of the present invention, therefore, is to provide new and improved nongelling cross-linking catalysts for use in electrophotographic processes.

Another object of the present invention is to provide novel catalyst materials to promote cross-linking of resinous binders which will consistently produce high quality acid etch-resist images from photoconductive recording elements employing said binders.

A further object of the invention is to provide a simple and economical process for preparing these novel cross-linking promoting catalysts.

In general, it has been found that the above and other objects and advantages can be obtained in accordance with the present invention by contacting aluminum salts of saturated fatty acids, such as, for example, aluminum dioctonoate commonly referred to as aluminum octoate, or as aluminum octonoate, in an alkaline medium with one or more primary straight chained glycol ether compounds, such as, for example, dipropylene glycol methyl ether, diethylene glycol n-butyl ether, diethylene glycol ethyl ether, ethylene glycol n-butyl ether, ethylene glycol methyl ether, ethylene glycol ethyl ether, diethylene glycol methyl ether, and tripropylene glycol methyl ether, thereby to form the novel alkoxy ether or mixed alkoxy ether aluminum fatty acid salts of the present invention, such as, for example, aluminum ethoxy methyl ether octonoate. These novel alkoxy ether aluminum salts have been found to be highly desirable as cross-linking promoting catalysts in obtaining consistent, high quality, sharp and clear, acid etch-resist images in recording elements used in the aforesaid electrophotographic processes.

Moreover, these novel catalysts unexpectedy do not gel liquid hydrocarbons when mixed therewith, even after extremely prolonged periods of storage or standing, thereby providing a useful life to catalyst-containing developer solutions or liquid developer concentrates of several weeks and months.

More specifically, new and improved cross-linking catalysts of the present invention corresponding to the formula

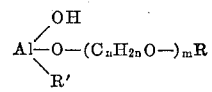

wherein R' represents a fatty acid radical containing from 6 to 12, inclusive, carbon atoms, $n$ represents an integer of from 2 to 3, inclusive, $m$ represents an integer of from 1 to 3, inclusive, and R represents an alkyl radical containing from 1 to 4 carbon atoms, inclusive, are prepared by contacting an aluminum fatty acid salt, the aliphatic fatty acid radical thereof having from 6 to 12 carbon atoms, inclusive, with one or more of a primary straight chained glycol ethers while maintaining an alkaline reaction medium having an apparent pH with moist pH paper greater than about 9 but less than about 13, and preferably about 11.

Preferably the aforesaid alkaline reaction medium is obtained by saturating the reaction mixture with ammonia.

In addition, however, rather than ammonia, aliphatic or aromatic amines, such as, for example, diethylamine or aniline may also be used in an amount sufficient to maintain said pH.

Generally, the reaction is carried out over a period of from about 15 minutes to about 2 hours at a temperature within the range of from about 20° to about 250° C., but preferably from about 25° to about 50° C. for a period of about 1 hour. Though the reaction may be run over periods in excess of 2 hours, no particular advantage results in doing so. A reaction time and temperature of less than the minimum as stated above may also be used, however, in doing so, a less than complete reaction is usually obtained.

Though not critical, the exact reaction temperature and time combination to be employed will be governed by the eaction rate, the glycol ether employed and degree of ompletion desired as may be determined by one skilled 1 the art. That is, the higher the temperature and time eriod, the greater is the reaction rate and completion. If emperatures above the boiling point of the reactants or eaction products are employed, it is understood that the ppropriate pressure equipment will be used.

Though the aforesaid glycol ethers and aluminum salts vill react together in substantially all proportions, an excess of the glycol ether is normally employed in the process of the present invention. Such excess, however, need nly be sufficient to make a slurry of said salt in said glycol ether. The glycol ether and salt so-slurried facilitates the reaction rate. It is convenient, therefore, to employ a glycol ether-to-salt weight ratio of from about 2.5 to about 10 or higher, with a ratio of about 5 being preferred. When stoichiometric amounts of said glycol ether ind salt are used, an inert diluent, such as, for example, benzene, is preferably used in an amount sufficient to obtain a slurry of the reactants.

A gentle agitation in the reaction vessel, though not necessary, is preferred. Such agitation may be provided by conventional means, such as, for example, an electrically driven paddle mixer, or an externally actuated magnetic agitation device.

Only one of the aforesaid glycol ethers is normally employed in preparing the aforesaid catalysts, however, combinations of said glycol ethers may also be employed, thereby making mixed alkoxy ether aluminum fatty acid salts, which are also highly desirable in promoting cross-inking of resins.

After the reaction has been carried out as above specified, the supernatant liquid is then separated from the alkoxy ether aluminum product as, for example, by filtration, preferably under suction, and washed with organic solvent, such as, for example, acetone, in which the product is not soluble, and air-dried for approximately 1 hour followed thereafter by drying in a partially evacuated oven for a period of time from approximately 1 to 16 hours at a temperature within the range of from about 75° to 100° C. Glycol ethers of the same kind as those used in the reaction may also be used as a wash solution, however, acetone is preferred.

After having prepared the novel nongelling catalyst of the present invention as specified above, it is normally used for developing latent electrostatic images, that is, in cross-linking the aforesaid resin binders to form an acid etch resist image. The novel alkoxy ether aluminum fatty acid salt is then suspended in a carrier liquid in which the catalyst is substantially insoluble, such as, for example, n-heptane, and flowing said liquid over a recording element having such a latent electrostatic image to be developed, followed by rinsing and heating to cure the cross-linked resin to a hard "resist." Images so-obtained are sharp and clear, are not ragged, and solid image areas are completely filled in. Of course, all the non-cross linked, non-resist, background areas are washed away to expose the bare metal to be etched as aforesaid to finally produce a quality photoengraving printing plate.

Among the resins which may be cross linked and cured to form "resists" by the catalysts of the present invention in a process for developing an electrophotographic plate are included silicone intermediate resin such as SR-82 resin and Z-6018 resin (made by Dow Corning Corp.), and, for example, epoxy resins of diglycidyl ether of bis-phenol-A having an epoxide equivalent weight of from 475 to 2000, and other suitable resinous binders such as disclosed in U.S. Letters Patent 3,231,374.

The following examples serve to further illustrate the present invention but are not intended to limit it thereto.

*Example 1*

About ten grams of commercial grade aluminum di-octonoate was admixed with about 100 cc. of ethylene glycol ethyl ether (92.8 grams) in a closed 1000 ml. container. The resulting suspension was then saturated with anhydrous ammonia by bubbling. The reaction mass was thereafter stirred for about 16 hours at 25° C. during which time an exchange reaction occurred in the solid phase to form an insoluble product of aluminum ethoxy ethyl ether octoate. After quiescence for about 15 minutes, the supernatant liquid was decanted and the so-formed insoluble product purified by extracting with 5 volumes of acetone and washing with 5 volumes of ambient temperature water on a filter, whereupon, it was dried in an oven for 16 hours at 80° C.

Upon analysis, the alkoxy ether product was found to be a non-crystalline, low density, white powdery material having the following elemental analysis:

| | Percent |
|---|---|
| Aluminum | 9.8 |
| Carbon | 53.04 |
| Hydrogen | 9.09 |
| Oxygen | 28.07 |

In addition, the product was found to have a molecular weight of about 276 and a melting point within the range of from about 300° to about 320° C. Furthermore, upon being examined by infrared analysis the product exhibited absorption bands in differentiation from the aluminum di-octonoate starting material similarly analyzed. The bands shown were at 3.51 microns, which is characteristic of the alkoxy group, at 6.36 microns, which is characteristic of the $-CO_2^-$ (carbonyl) group, and, in addition, an intense band was observed at 9 microns likely resulting from R—O—Al units. None of these bands were observed for aluminum octoate thus showing that the present product and novel compounds of the present invention are substantially dissimilar from the aluminum octonoate starting material. In addition to the elemental and infrared analyses above, the solution obtained from the hydrolysis reaction of the product with one normal NaOH was analyzed by vapor phase chromatography and compared to ethylene glycol ethyl ether and ethyl alcohol as controls. The analysis showed both the control and hydrolysate to have essentially the same alkoxy ether group intact thus indicating the attachment of the alkoxy ether group to the aluminum. In view of the above infrared, elemental and chromatographic analyses the product indicated a probable structure of:

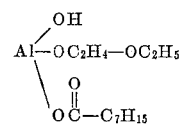

In order to determine its effectiveness as a cross-linking promoting catalyst for the cross-linkable resin-type insulation binder in the art of electrophotography, a portion of the above material was suspended in a carrier liquid of n-heptane and the suspension used in accordance with the hereinbefore described electrophotographic process in conjunction with several electrostatically charged photoconductive zinc oxide recording elements each being mounted on a conductive metal back. These plates were contacted with the carrier containing the catalyst product after being exposed to a light image, whereupon, they were each heated at 225° C. for 8 minutes to obtain a cross-linked etch-resist coating. In every case the resulting coatings produced quality etch resists. Furthermore, the alkoxy ether product when suspended in said carrier liquid caused no gelation thereof even after prolonged periods of, for example, 30 days or more, thus illustrating that it is not a gelling agent as is aluminum octoate, the latter being commercially used as a gelling agent for hydrocarbon liquids. The resin binder used in this example was SR-82 silicone intermediate resin.

*Example 2*

10 grams of the same grade of aluminum octonoate as used in the above example was reacted with about 100 ccs. of ethylene glycol methyl ether saturated with anhydrous ammonia at a temperature of about 25° C. and stirred for about 16 hours in a closed vessel. A white, insoluble product of aluminum ethoxy methyl octoate was formed, whereupon, when analyzed and tested, it was found to be an effective cross-linking promoting catalyst and consistently produced quality etch-resist images. Like the product produced in Example 1, it did not cause gelation in the carrier liquid of n-heptane in which it had been suspended.

*Example 3*

Similarly, as in Examples 1 and 2 above, ammoniacal diethylene glycol methyl ether, diethylene glycol ethyl ether, diethylene glycol n-butyl ether, dipropylene glycol methyl ether, and tripropylene glycol methyl ether may also be reacted in accordance with the present invention with aluminum hexanoate, heptanoate, octanoate, nonanoate, decanote, hendecanoate, or aluminum, dodecanoate to produce the corresponding dialkoxy ether aluminum fatty acid salts of the present invention. These novel nongelling salts of the invention act effectively as cross-linking catalysts and when suspended in carrier liquids such as n-heptane, even for prolonged periods, do not cause gelation thereof.

Various changes and modifications can be made in the process of the present invention without departing from the spirit or scope thereof and it is understood that I limit myself only as defined in the claims appended hereto.

I claim:

1. In an electrophotographic method of preparing etchable printing plates employing a photoconductive zinc oxide in a cross-linkable resin-type insulating binder as a photoconductive recording element with an electrostatic charge, exposing the so-charged element to a light image thereby forming a latent electrostatic image thereon, developing said electrostatic image by contacting and subsequent heating with a catalyst material which promotes cross-linking of said cross-linkable binder to form an etch resist image; the improvement which comprises using as a cross-linking catalyst for said cross-linkable resin-type insulating binder an alkoxy ether aluminum fatty acid salt corresponding to the formula

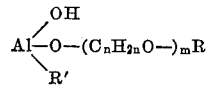

wherein R' represents a fatty acid radical containing from 6 to 12, inclusive, carbon atoms, $n$ represents an integer of from 2 to 3, inclusive, $m$ represents an integer of from 1 to 3, inclusive, and R represents an alkyl radical containing from 1 to 4, inclusive, carbon atoms.

2. The improvement of claim 1 wherein aluminum ethoxy ethyl ether octonoate is used as the cross-linking catalyst.

References Cited

UNITED STATES PATENTS 3,214,450 10/1965 Michaels _____ 260—414
3,231,274 1/1966 Sciambi _____ 96—1

NORMAN G. TORCHIN, *Primary Examiner.*

C. E. VAN HORN, *Assistant Examiner.*